United States Patent [19]
Sanda et al.

[11] 3,980,057
[45] Sept. 14, 1976

[54] TORCH IGNITION TYPE INTERNAL COMBUSTION ENGINE

[75] Inventors: Shougo Sanda, Okazaki; Norihiko Nakamura, Mishima, both of Japan

[73] Assignee: Toyota Jidosha Kogyo Kabushiki Kaisha, Toyota, Japan

[22] Filed: Feb. 18, 1975

[21] Appl. No.: 550,632

[30] Foreign Application Priority Data
July 31, 1974   Japan.................................. 49-87800

[52] U.S. Cl............................... 123/32 K; 123/32; 123/191
[51] Int. Cl.² ......................................... F02B 23/00
[58] Field of Search............ 123/32 C, 32 D, 32 K, 123/32 ST, 32 SP, 33 D, 75 B, 144, 191 S, 191 SP

[56] References Cited
UNITED STATES PATENTS

| | | | |
|---|---|---|---|
| 1,719,705 | 7/1929 | Kondo............................. | 123/191 S |
| 1,812,197 | 6/1931 | Bollington..................... | 123/191 SP |
| 3,044,454 | 7/1962 | Sutton............................... | 123/32 C |
| 3,238,931 | 3/1966 | Rodriguez........................ | 123/33 D |
| 3,830,205 | 8/1974 | Date et al........................ | 123/191 S |

Primary Examiner—Charles J. Myhre
Assistant Examiner—Paul Devinsky
Attorney, Agent, or Firm—Stevens, Davis, Miller & Mosher

[57] ABSTRACT

A torch ignition type internal combustion engine with no intake valve in the auxiliary combustion chamber, the engine comprising: a cylinder; a cylinder head; a reciprocating piston received snugly in said cylinder; a main combustion chamber defined between said cylinder head and an end face of said reciprocating piston and equipped with intake and exhaust valves to control intake and exhaust ports in the cylinder head; an auxiliary combustion chamber provided in the head of said cylinder; a passage interconnecting said main and auxiliary combustion chambers; and an ignition plug having sparking electrodes located in said passage; said auxiliary combustion chamber having a volume of a ratio within the range of 0.0106:1 to 0.0137:1 with respect to the volume of displacement of said piston and said passage having a cross-sectional area of a ratio within the range of 0.009:1 to 0.023:1 with respect to the cross-sectional area of said end face of said piston.

3 Claims, 4 Drawing Figures

TORCH IGNITION TYPE INTERNAL COMBUSTION ENGINE

BACKGROUND OF THE INVENTION

1. Field of the Invention

This invention relates to a torch ignition type internal combustion engine, and more particularly to a torch ignition type internal combustion engine which has no intake valve in the auxiliary combustion chamber.

2. Description of Prior Art

It is well known in the art to burn a rather lean air-fuel mixture in the engine cylinder in order to reduce the toxic components such as carbon monoxide, hydrocarbons and nitrogen oxides which are usually present in the exhaust gas of an engine. A lean air-fuel mixture, however, has potentially inferior ignitability and inferior flame propagation velocity, compared with a rich air-fuel mixture. Therefore, it is of crucial importance for an engine which burns a lean air-fuel mixture to stabilize the ignitability and increase its flame propagation velocity, otherwise a poor thermal efficiency and/or toxic exhaust gas (such as unburnt hydrocarbons) would result.

In order to overcome the aforementioned difficulty, there has been introduced the so-called torch ignition type internal combustion engine which has a main combustion chamber with an intake valve and an exhaust valve, and an auxiliary combustion chamber with an auxiliary intake valve, the engine being adapted to supply a lean air-fuel mixture to the main combustion chamber and a relatively rich mixture to the auxiliary combustion chamber through the respective intake valves. In such an engine system, the relatively rich air-fuel mixture in the auxiliary combustion chamber is first ignited and burned, the flames bursting from the auxiliary combustion chamber subsequently igniting the lean air-fuel mixture in the main combustion chamber. This internal combustion engine with an intake valve in the auxiliary combustion chamber is able to improve the ignitability of the lean air-fuel mixture and also to achieve high flame propagation velocity. On the other hand, such internal combustion engine invariably has complicated construction due to the requirement for the provision of the auxiliary intake valve in the auxiliary combustion chamber. Such a valve requires a complicated valve operating mechanism for operating the valves synchrounously with the engine revolution.

The present inventors have previously proposed a torch ignition type internal combustion engine which comprises a main combustion chamber with an intake valve and an exhaust valve, an auxiliary combustion chamber with no auxiliary intake valve, a passage interconnecting the main and auxiliary combustion chambers, and an ignition plug having its sparking electrodes located in the vicinity of the interconnecting passage. In this torch ignition type internal combustion engine, a lean air-fuel mixture sucked into the main combustion chamber through the intake valve during the intake stroke of the piston is pushed into the auxiliary combustion chamber during the succeeding compression stroke through the passage interconnecting the main and auxiliary combustion chambers. In this engine, a lean-fuel mixture can be ignited easily since there is only fresh air-fuel mixture around the sparking electrodes of the ignition plug which is located near the passage, that is, there is no residual gas remainining around the electrodes at the time of ignition, because the residual gas in the passage has been flown into the auxiliary combustion chamber by the lean mixture passing the passage during compression stroke. Then the lean air-fuel mixture in the main combustion chamber is ignited by the torch flames bursting not from the auxiliary combustion chamber, resulting from the mixture combustion in the auxiliary combustion chamber.

In the above-described torch ignition type internal combustion engine with no intake valve in the auxiliary cpombustion chamber, it is essential to control the mass and velocity of the torch flame coming out through the interconnecting passage to ensure optimum ignition and combustion of the lean air-fuel mixture in the main combustion chamber.

SUMMARY OF THE INVENTION

It is an object of the present invention to provide a torch ignition type internal combustion engine which has no intake valve in the auxiliary combustion chamber and which can ensure stabilized ignitability and rapid combustion under various operating conditions of the engine.

It is another object of the present invention to provide a torch ignition type internal combustion engine of the nature mentioned above, which can substantially reduce the amount of toxic components such as the carbon monoxide, unburnt hydrocarbons and nitrogen oxides from the exhaust gas while achieving high thermal efficiency.

Still another object of the invention resides in the provision of a torch ignition type internal combustion engine of the type mentioned above, which effectively eliminates the disadvantages encountered with the prior art constructions. That is, to provide a torch ignition type internal combustion engine which is simple in construction and reliable in operation.

According to the prsent invention, there is provided a torch ignition type internal combustion engine which has no intake valve in the auxiliary combustion chamber comprising: a cylinder; a cylinder head; a main combustion chamber defined between said cylinder head and an end face of said reciprocating piston and equipped with intake and exhaust valves to control intake and exhaust ports in said cylinder head; an auxiliary combustion chamber provided at a suitable position in the cylinder head; a passage interconnecting said main and auxiliary combustion chambers; and an ignition plug having sparking electrodes located in said passage; said auxiliary combustion chamber having a volume of a ratio within the range of 0.0106:1 to 0.0137:1 with respect to the volume of displacement of said piston and said passage having a cross-sectional area of a ratio within the range of 0.009:1 to 0.023:1 with respect to the cross-sectional area of said end face of the piston.

The above and other objects, features and advantages of the invention will become clearer from the following particular descriptions of theinvention, the appended claims and the accompanying drawing which show by way of example a preferred embodiment of the present invention.

PARTICULAR DESCRIPTION OF THE INVENTION

Figure 1:
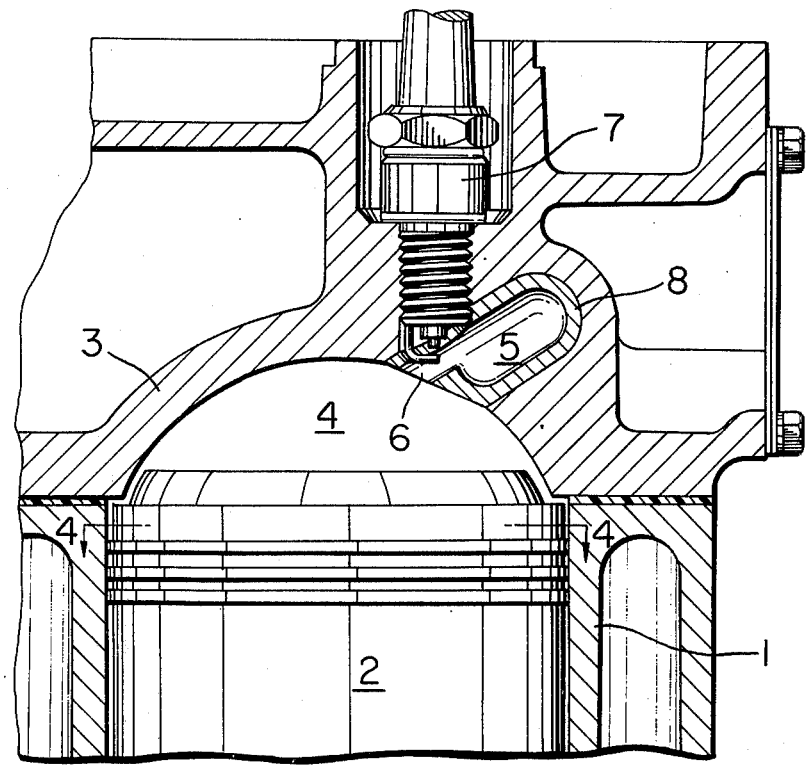
FIG. 1 is a sectional view of the torch ignition type internal combustion engine according to the invention.

Referring to the accompanying drawings and first to FIG. 1, the torch ignition type internal combustion engine according to the present invention includes a cylinder 1 and a piston 2 which is snugly received in the cylinder 1 for reciprocating movement therein in the usual manner. A main combustion chamber 4 is defined between the end face of the piston 2 and the cylinder head 3. An auxiliary combustion chamber 5 provided in the cylinder head 3 is connected with the main combustion chamber 4 through a passage 6. An ignition plug 7 has its sparking electrodes located in the passage 6. The auxiliary combustion chamber 5 has a hollow cylindrical body 8 which is made of heat resistant material such as stainless steel and is tight-fitted into the cylinder head 3, preferably by means of a press-in fit.

The present inventors have found as a result of a number of experiments conducted on the torch ignition type internal combustion engine with no intake valve in the auxiliary combustion chamber as shown in FIG. 1: that the volume and velocity of the burning gas flames bursting out through the passage 6 into the main combustion chamber 4 decisively influence the combustion of the lean air-fuel mixture in the main chamber; and that the velocity of air-fuel mixture being pushed into the auxiliary combustion chamber through the communicating passage at the time of ignition also decisively influences the ignitability of lean air-fuel mixture. Both the volume and velocity of the bursting flames and the velocity of air-fuel mixture being pushed into the auxiliary combustion chamber vary in relation to the volume $V_1$ of the auxiliary combustion chamber 5 and to the cross-sectional area $A_1$ of the passage 6. The two variables, $V_1$ and $A_1$ are interdependent on each other and the present inventors have found, after extensive experimentation that there is relatively narrow ranges for both $V_1$ and $A_1$ to obtain stabilized ignitability and rapid combustion for various engine operating conditions.

Figure 2:
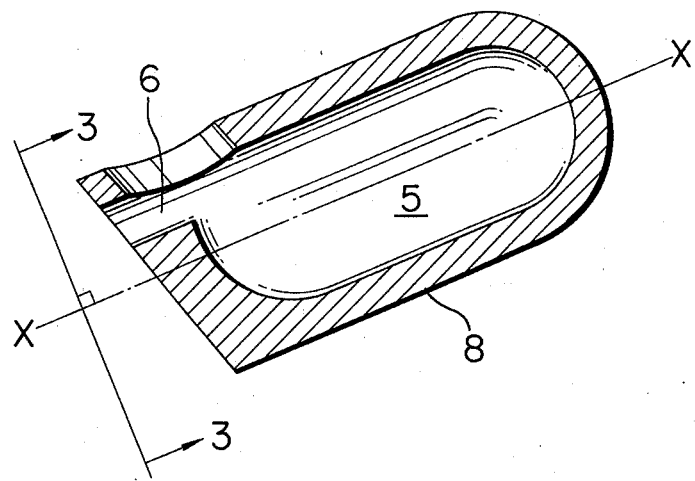
FIG. 2 is a sectional view showing on an enlarged scale the auxiliary combustion chamber of the engine of the FIG. 1.
Figure 3:
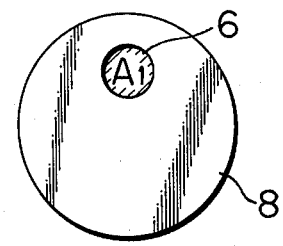
FIG. 3 is a sectional view taken along line 3—3 of the FIG. 2.
Figure 4:
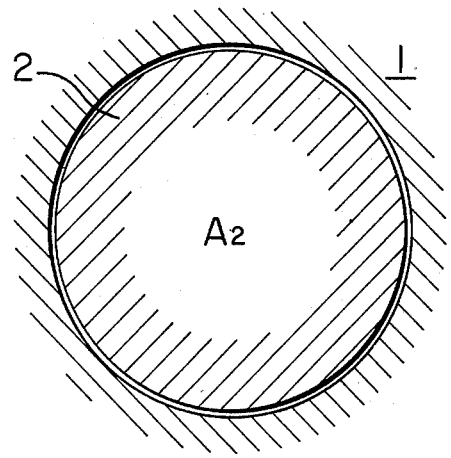
FIG. 4 is a sectional view taken along the line 4—4 of the FIG. 1.

More particularly, satisfactory results are obtainable when the auxiliary combustion chamber 5 of the internal combustion engine of the invention has a cylindrical body 8 with longitudinal axis $x-x$ as shown in FIG. 2 and has a volume $V_1$ of a ratio within the range of 0.0106:1 and 0.0137:1 with respect to $V_2$, the volume of displacement of the piston 2. Furthermore, the cross-sectional area $A_1$ (FIG. 3) of the passage 6 of the engine is in a ratio within the range of 0.009:1 to 0.023:1 with respect to the cross-sectional area $A_2$ (FIG. 4) of the end face of the piston 2.

As discussed hereinbefore, in order to ensure stabilized ignitability and rapid combustion of the lean air-fuel mixture in the combustion chamber, it is important to consider the velocity of air-fuel mixture being pushed into the auxiliary combustion chamber and the amount and velocity of the flames bursting out from the auxiliary combustion chamber and both of which are influenced by the volume of the auxiliary combustion chamber as well as the cross-sectional area of the passage interconnecting the main and auxiliary combustion chambers. In the present invention, the volume of the auxiliary combustion chamber is determined in relation to the volume of displacement of the piston and the cross-sectional area of the passage in relation to the area of the end face of the piston to provide a torch ignition type internal combustion engine with no intake valve in the auxiliary combustion chamber which is most stabilized in ignition and combustion under any operating conditions of the engine.

What is claimed is:

1. A torch ignition internal combustion engine of the type which has no intake valve in the auxiliary combustion chamber, said engine comprising:

a cylinder;

a cylinder head;

a reciprocable piston in said cylinder;

a main combustion chamber defined between said cylinder head and an end face of said piston and equipped with intake and exhaust valves;

an auxiliary combustion chamber in said cylinder head;

a passage directly interconnecting said main and auxiliary combustion chambers, one end of said passage opening into said main combustion chamber and the other end thereof opening into said auxiliary combustion chamber; said passage having a uniform transverse cross-sectional area from the one end to the other end thereof;

an ignition plug having sparking electrodes in said passage;

said auxiliary combustion chamber being completely closed except for the opening of said passage thereinto; and the ratio of the volume of the auxiliary combustion chamber to the volume of displacement of the piston is within a range of 0.0106:1 to 0.0137:1 and the ratio of the transverse cross-sectional area of said passage to the cross-sectional area of the end face of said piston is within a range of 0.009:1 to 0023:1.

2. A torch ignition internal combustion engine as defined in claim 1, wherein said auxiliary combustion chamber has a hollow cylindrical body which is made of heat resistant material.

3. A torch ignition internal combustion engine as defined in claim 2, wherein said hollow cylindrical body of said auxiliary combustion chamber is pass fitted in the cylinder head.

* * * * *